C. L. Frink,
Steam Gage Cock,
No. 55,638. Patented June 19, 1866.
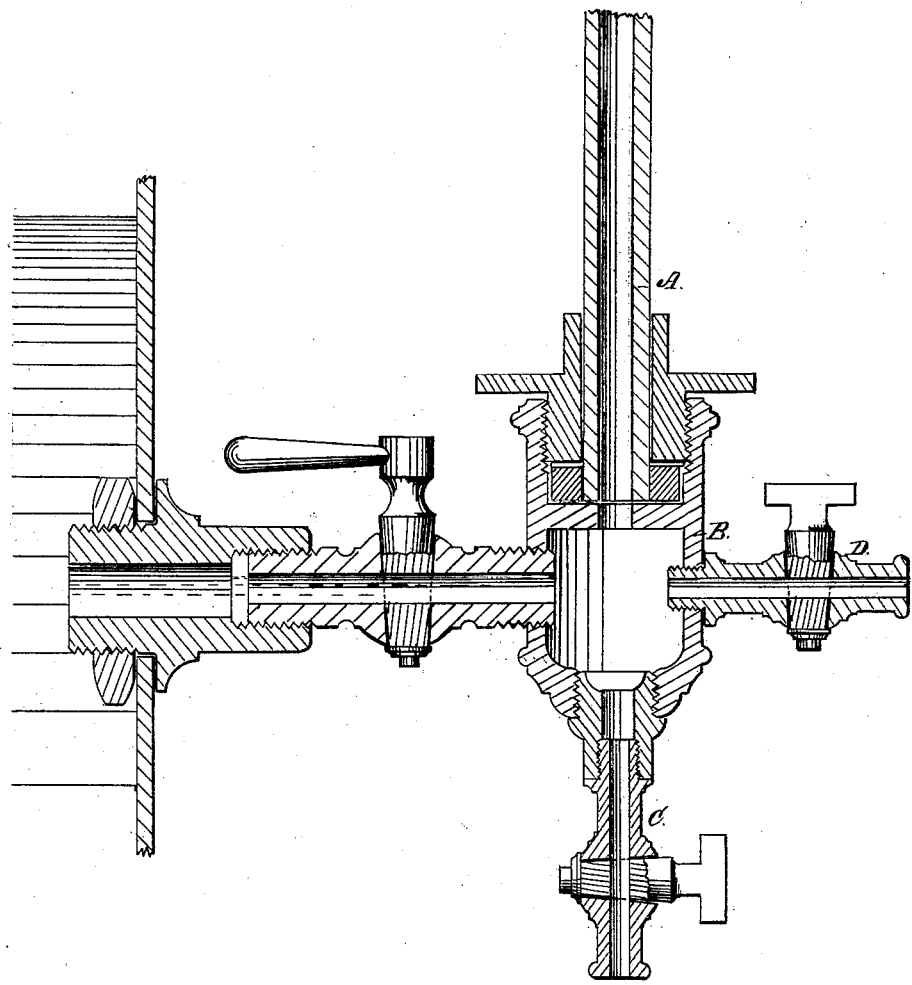

UNITED STATES PATENT OFFICE.

C. L. FRINK, OF ROCKVILLE, CONNECTICUT.

IMPROVEMENT IN GAGES FOR BOILERS.

Specification forming part of Letters Patent No. 55,638, dated June 19, 1866.

*To all whom it may concern:*

Be it known that I, C. L. FRINK, of Rockville, Tolland county, State of Connecticut, have invented a new and Improved Socket for Water-Gages; and I do hereby declare that the following is a full, clear, and exact description thereof, which will enable others skilled in the art to make and use the same, reference being had to the accompanying drawing, forming part of this specification.

The drawing represents a vertical central section of this invention.

This invention consists in the arrangement of a safety-cock in line with the channel leading from the lowest socket of a water-gage to the water-space of a steam-boiler, in combination with the ordinary blow-off cock at the bottom end of said socket, in such a manner that by opening the safety-cock before the blow-off cock is opened a jet of solid water is poured through the socket at right angles with the bore of the glass tube, and thereby the steam is prevented from blowing through the gage when the blow-off cock is opened, and the danger of breaking the glass tube is avoided.

A represents the glass tube of an ordinary water-gage. This glass tube is fastened at top and bottom in suitable sockets B, (the bottom socket only being shown in the drawing,) which are in connection with the interior of the steam-boiler—the top socket with the steam-space and the bottom socket with the water-space.

A cock, C, at the bottom end of the lowest socket and in line with the bore of the glass tube serves to blow off the water contained in said tube, an operation which is necessary, at shorter or longer intervals, to prevent impurities contained in the water from adhering to the interior of the glass tube. When this blow-off cock is opened a jet of steam passes clear through the glass tube, and it is the action of this steam which causes the glass tubes to crack more than any other cause. In order to avoid this difficulty I have applied to the socket B a safety-cock, D, which is situated in line with the channel leading from said socket to the water-space of the boiler. If this safety-cock is opened previous to opening the blow-off cock a jet of solid water is driven out through the same, and the steam is prevented from blowing clear through the glass tube. By this arrangement the glass tube can be kept perfectly clean, and the chief danger of breaking the same is avoided.

What I claim as new, and desire to secure by Letters Patent, is—

The arrangements of the cocks C D, in combination with the socket B and tube A, and operating in the manner and for the purpose herein specified.

C. L. FRINK.

Witnesses:
 R. L. FRUIC,
 E. I. SMITH.